(12) United States Patent
Pack et al.

(10) Patent No.: US 7,546,912 B1
(45) Date of Patent: Jun. 16, 2009

(54) COMMUNICATIONS SPOOLER FOR A MOBILE ROBOT

(75) Inventors: Robert Todd Pack, Nashua, NH (US);
Tyson Sawyer, Rindge, NH (US);
Chikyung Won, Tewksbury, MA (US);
Grinnell More, Temple, NH (US)

(73) Assignee: iRobot Corporation, Burlington, MA (US)

( * ) Notice: Subject to any disclaimer, the term of this patent is extended or adjusted under 35 U.S.C. 154(b) by 17 days.

(21) Appl. No.: 11/648,445

(22) Filed: Dec. 29, 2006

Related U.S. Application Data

(62) Division of application No. 10/811,316, filed on Mar. 26, 2004, now Pat. No. 7,331,436.

(60) Provisional application No. 60/457,563, filed on Mar. 26, 2003, provisional application No. 60/532,352, filed on Dec. 24, 2003.

(51) Int. Cl.
*H02G 11/02* (2006.01)

(52) U.S. Cl. .................... 191/12.2 A; 191/12.2 R; 901/1

(58) Field of Classification Search .............. 242/412.2
See application file for complete search history.

(56) References Cited

U.S. PATENT DOCUMENTS

| | | | |
|---|---|---|---|
| 4,666,102 A | 5/1987 | Colbaugh et al. | |
| 4,736,826 A | 4/1988 | White et al. | |
| 4,842,207 A | 6/1989 | Kinnan | |
| 4,897,512 A | 1/1990 | Johnston | |
| 5,007,599 A | 4/1991 | Forsyth | |
| 5,056,612 A | 10/1991 | Roumagnac | |
| 5,498,940 A | 3/1996 | Kim et al. | |
| 5,502,358 A | 3/1996 | Lee | |
| 5,551,545 A | 9/1996 | Gelfman | |
| 5,647,554 A | 7/1997 | Ikegami et al. | |
| 6,113,343 A | 9/2000 | Goldenberg et al. | |
| 6,725,986 B2 | 4/2004 | Reindle et al. | |
| 6,988,854 B2 | 1/2006 | Porter | |

*Primary Examiner*—Sang Kim
(74) *Attorney, Agent, or Firm*—Goodwin Procter LLP

(57) ABSTRACT

A cable handling system mounted to a mobile robot to dispense and retrieve cable at zero tension includes a cable reel drive and a downstream tension roller drive that includes an idler. As a cable passes through the tension roller drive, position along the length of the cable and/or the cable speed is monitored accurately by a sensor attached to the idler. A system controller in communication with the sensor controls the cable reel drive and the tension roller drive for dispensing and retrieving cable downstream of the tension roller drive.

11 Claims, 13 Drawing Sheets

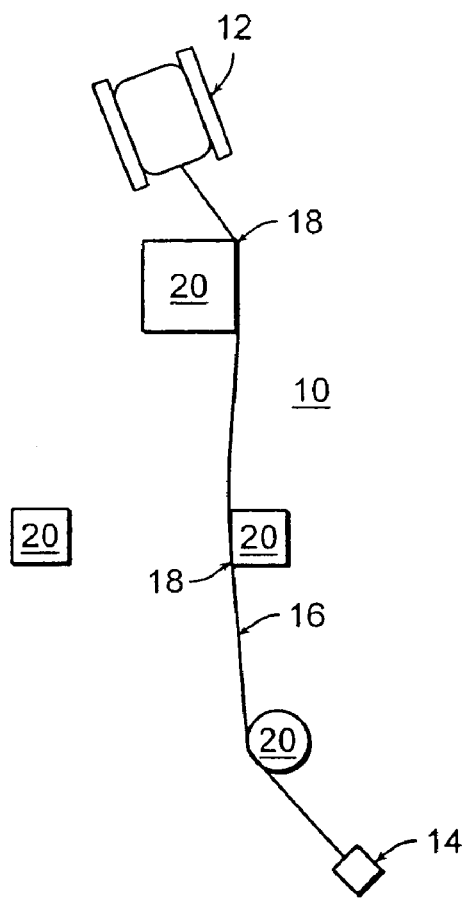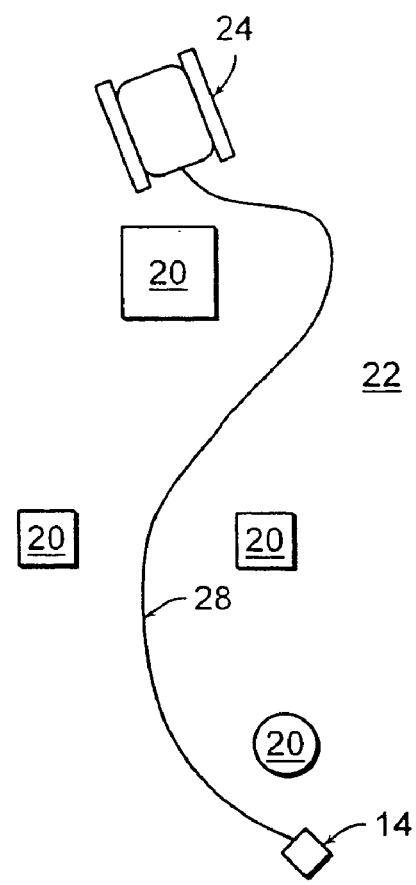
PRIOR ART
FIG. 1
FIG. 2

COMMUNICATIONS SPOOLER FOR A MOBILE ROBOT

RELATED APPLICATIONS

This application incorporates by reference in its entirety and is a divisional of and claims priority to U.S. patent application Ser. No. 10/811,316, entitled "Communications Spooler for a Mobile Robot," filed on Mar. 26, 2004, now U.S. Pat. No. 7,331,436, which incorporates by reference in their entireties and claims priority to U.S. Provisional Patent Application Ser. No. 60/457,563, entitled "Improved Communications Spooler for a Mobile Robot," filed on Mar. 26, 2003; and U.S. Provisional Patent Application Ser. No. 60/532,352, entitled "Communications Spooler for a Mobile Robot," filed on Dec. 24, 2003.

TECHNICAL FIELD

The present invention relates generally to unmanned vehicles and robotic systems and, more specifically, to communications spoolers used in conjunction with robotic systems.

BACKGROUND

Robots and robotic devices are used today to perform tasks traditionally considered dangerous or otherwise inappropriate for humans, due to size or environmental considerations. For example, robots are often purposefully exposed to situations where the risk to a human being in a similar situation is too high. In one illustrative example, explosive ordnance disposal ("EOD") robots are used to approach, inspect, and even remove or defuse explosives or objects that may contain explosives. Generally, a human operator of an EOD robot remains at a safe distance from the explosive (or possibly explosive) object and directs the EOD robot remotely as it performs its necessary tasks. Even though the EOD robots are often driven by remote control, incorporation of a physical tether between the robot and a base station near the operator is often favored. Tethered robots and other robotic platforms are being developed. For example, U.S. Pat. Nos. 6,263,989, 6,431,296, and 6,668,951 each disclose Robotic Platforms, the disclosures of which are hereby incorporated by reference in their entireties.

The tether may include a fiber optic cable, to provide a reliable, high speed, non-electric connection for sending signals to and from on-board actuators and sensors, including cameras, thus allowing the operator to control the mobile robot and view the area in immediate proximity to the robot during use. Fiber optic cables are generally preferred over wireless transceivers, because signals sent over wireless systems can suffer from limited range and radio or environmental interference. Also, in certain situations (e.g., near an explosive device), radio frequency transmissions may not be allowed. These circumstances and restrictions can reduce the quality of communications and limit or end the mission. This is often the case indoors or underground, due to interference with surrounding building structure. Use of a tethered cable, however, does have its limitations, one of the most apparent being that cables trailed behind mobile robots can become snagged as the robot moves around corners or other obstacles. These snags, in addition to effecting the motion of the robot by creating a dragging force as the robot moves, also create high stress points on the cable, which can lead to intermittent communication or damage of the cable itself. Often, the cable is under a state of tension as the robot or vehicle moves ahead. If the robot turns in place this tension will often pull the cable directly into the moving parts of the mobility system, resulting in the cable becoming wound around an axle or tangled in the drive treads. Clearly, these problems increase as the robot moves within more complicated environments or structures.

To avoid these situations, cable handling systems have been developed that dispense cable behind a moving robot. Such handling systems generally utilize a reel of cable that rotates as the robot moves to pay out or draw in cable, in conjunction with some type of second device to detect and/or control cable tension. For example, some variations of these second devices detect strain in components that the cable passes through and compensate by paying out cable faster, thus relieving the strain. Still other devices include a sensor on a tensioning roller, remote from the main hub, that helps compensate for increases or decreases in speed of the robot, and distributes cable accordingly.

Many of these present spooler systems, however, are unable to compensate for abrupt changes in speed of the robot, or are unable to work effectively at high speed. Other cable handling systems are unable to accurately compensate for turns (especially turns described as neutral or "zero radius") of the robot and either dispense or retract an insufficient or excessive length of cable. Other cable handling systems are bound to the input of a single variable to manage the cable and may pay out or draw in an improper amount of cable as long as that variable is satisfied, regardless of competing needs of the operating robot or surrounding environmental conditions.

There is, therefore, need for a spooler system that can reliably dispense and retrieve cable at various speeds, that is able to respond to abrupt changes in vehicle speed or cable tension, and that can accurately pay out and draw in cable, in an intelligent manner, during all types of maneuvers across a wide range of operational terrains.

SUMMARY OF THE INVENTION

In one aspect, the invention relates to a cable handling system including: a cable reel drive; a downstream tension roller drive including an idler; an idler sensor for determining at least one of a position along a length of cable and a cable speed; and a system controller in communication with the sensor for controlling the cable reel drive and the tension roller drive for dispensing and retrieving cable downstream of the tension roller drive at substantially zero tension. In one embodiment of the foregoing aspect, the cable reel drive includes a motor and a sensor for determining rotation of the cable reel drive. In another embodiment of the foregoing aspect, the tension roller drive includes a motor and a sensor for determining rotation of the tension roller drive. A level wind mechanism, located between the cable reel drive and the tension roller drive, may be included in another embodiment of the foregoing aspect.

In various other embodiments of the same aspect, the system controller may include: a cable reel drive velocity controller; a tension roller drive torque controller; a cable state estimator for receiving signals from the idler sensor, the cable reel drive sensor, and the tension roller drive sensor; a feed forward compensator for providing a torque command to the cable reel drive velocity controller; and/or a cable gain scheduler for providing a compensating command to at least one of the cable reel drive and the tension roller drive. In another embodiment of the foregoing aspect, the cable reel drive and/or tension roller drive may further include a dynamic thermal limiter for monitoring a motor current and/or a motor case temperature.

In another aspect, the invention relates to a mobile platform including: a chassis; a chassis drive system; a drive system sensor for determining platform velocity; a cable handling system secured to the chassis for dispensing and retrieving cable from the mobile platform at substantially zero tension; and a system controller for controlling the cable handling system, the controller determining an effective cable velocity based at least in part on platform velocity and platform configuration. In one embodiment of the foregoing aspect, the system controller utilizes a rigid body transform function. In various other embodiments of the foregoing aspect, the system controller manages a plurality of cable management modes, which may include: a track mode; a track reverse mode; a track in mode; a track out mode; an error mode; and/or an idle mode.

In another embodiment of the foregoing aspect, the mobile platform also includes: a cable reel mounted to the cable handling system; and a cable including a first end portion, an intermediate portion, and a second end portion, wherein the first end portion is secured to the cable reel, the intermediate portion is wound about the cable reel and guided through the cable handling system, and the second end portion is downstream of the mobile platform. In other embodiments of the foregoing aspect, the second end portion of the cable is secured to a remote base and may be at least one of a fiber optic cable and a power cable.

In another aspect, the invention relates to a method of automatically dispensing and retrieving a cable including: providing a cable handling system secured to a mobile platform; determining at least one of a position along a length of cable and a cable speed; and controlling the cable handling system and the mobile platform such that the cable downstream of the platform is dispensed and retrieved at substantially zero tension.

In yet another aspect, the invention relates to a control system for a cable handling system including: a cable reel drive controller; a tension roller drive controller; an idler sensor for determining at least one of a position along a length of cable and a cable velocity; and a system controller for providing commands to the cable reel drive controller and commands to the tension roller drive controller, the commands based at least in part on a signal from the idler sensor, whereby a cable is dispensed and retrieved from the cable handling system at substantially zero tension.

In still another aspect, the invention relates to a control system for cable management of a mobile platform including: a platform drive system including a sensor for determining platform velocity; and a system controller for dispensing and retrieving a cable from the mobile platform at substantially zero tension, the system controller determining an effective cable velocity based at least in part on platform velocity and platform configuration.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the present invention are described with reference to the following drawings, in which:

FIG. 1 is a schematic view of a mobile robot during operation employing a prior art cable handling system;

FIG. 2 is a schematic view of a mobile robot during operation employing a cable handling system in accordance with one embodiment of the invention;

DETAILED DESCRIPTION

Figure 3A:
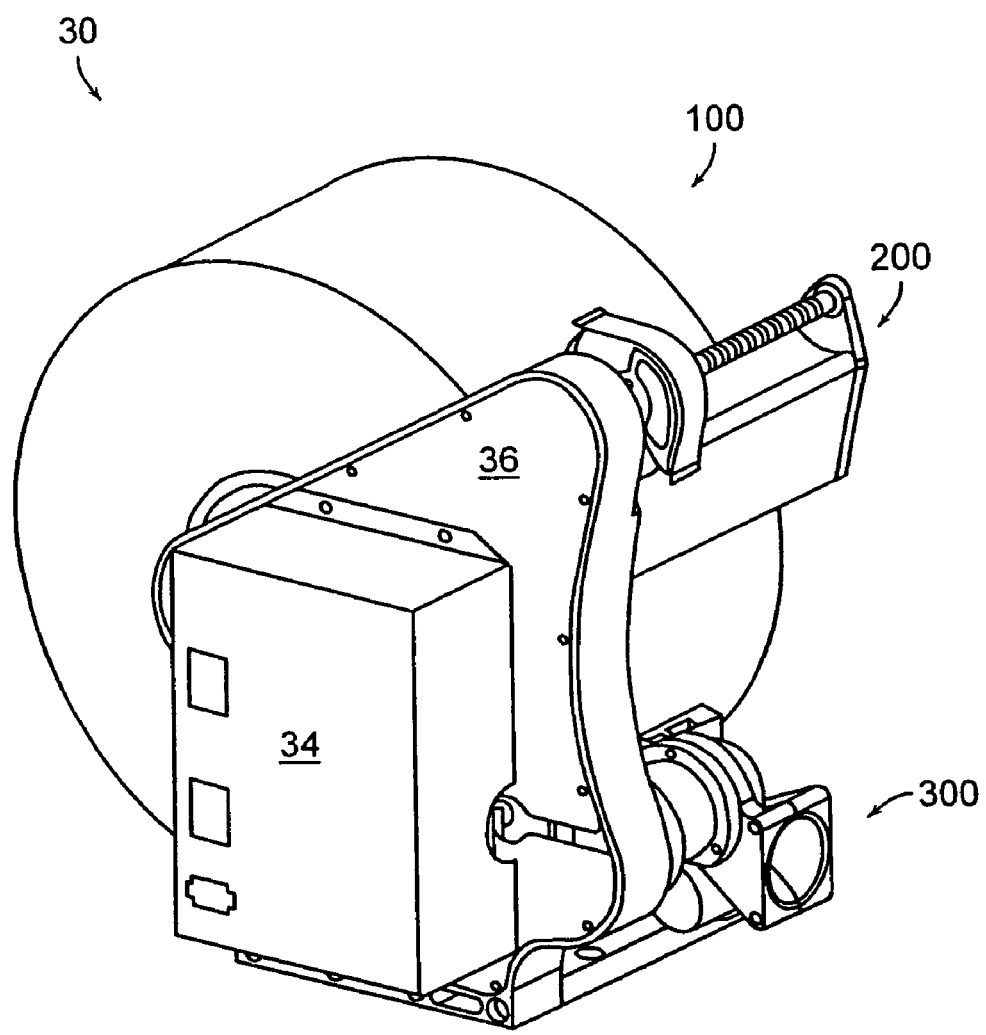
FIGS. 3A-3B are schematic perspective views of a cable handling system in accordance with one embodiment of the invention.

FIG. 1 is a schematic view of a mobile robot 12 employing a prior art cable handling system during operation. The robot 12 operates in an area 10, that may be either bounded (as within a room or other enclosed space) or unbounded (as being used outdoors). An operator (not shown) directs the robot 12 from or near a remote, stationary base 14. Generally, the operator navigates the robot 12 as required during the course of an appointed task, driving or otherwise guiding the robot 12 around and in between a number of obstacles 20. A cable 16 is dispensed from the robot 12 as it moves away from the base 14. Since the cable 16 is kept taut, it can get caught on the obstacles 20, creating kinks 18 as the cable bends around them. These kinks 18 can damage the cable 16 and effect the integrity of transmission of a signal along the cable 16. Additionally, the cable 16 is subject to high-tension loads that can have a detrimental effect on the longevity of the cable 16. The tension on the cable 16 also requires the use of grounding contacts at the base 14, to anchor the cable 16 and prevent the cable 16 from being inadvertently pulled from the base 14.

Contrasted with the prior art depicted in FIG. 1, a schematic view of a mobile robot 24 employing a cable handling system in accordance with one embodiment of the invention is shown during operation in FIG. 2. The depicted components are similar to those in FIG. 1: a robot 24, is operated through an area 22, around and between obstacles 20, by an operator (not shown) near a stationary base 26. The robot 24 leaves in its path a cable 28 that is dispensed and retrieved as the robot 24 moves away from and toward the base 26. The handling system of the present invention, however, deploys and retrieves the cable 28 with substantially no tension and, thus, kinks are eliminated on the cable 28. Additionally, because the cable is under no tension between the robot 24 and the base 26, wear on the cable 28 is greatly reduced and the possibility of traumatic damage caused by the operating environment is virtually eliminated.

One of ordinary skill in the art will recognize the host of applications to which the handling system of the present invention is advantageously suited. While the illustrative example in this specification is an EOD robot, robots and unmanned vehicles used for other purposes may also employ the handling system of the present invention. For example, robots used to survey areas contaminated by nuclear, chemical, or biological waste, or robots employed to inspect spaces too small or dangerous for a human being could use the handling system. Also, as used herein in the specification, the terms "cable" and "fiber" are used interchangeably to describe any tether dispensed or retrieved by the robot. While this cable may be a fiber optic or other communications cable used in conjunction with an EOD robot, the handling system of the present invention is equally suited to other types of cable, as well. Examples include electric power cable, telephone or other data cable, pneumatic or hydraulic hose, or explosive detonation cord. The latter could be particularly useful on an EOD robot, as the robot could approach a target, dispensing detonation cord as needed, deploy an explosive device, and leave the area. The operator then need only detonate the explosive to trigger the larger target, with the robot safely outside the range of the resulting explosion.

The handling system of the present invention could also be used in devices much less sophisticated than an EOD robot. Generally, any type of mobile platform, whether remotely operated or not, that uses an attached cable, could benefit from such a system. Such platforms include, for example and without limitation, electric vacuum cleaners and lawn mowers. The handling system of the present invention would be particularly useful in the latter application, as the risk of running over and cutting the trailing electric cable could be greatly reduced with appropriate tracking algorithms, since the cable is constantly being dispensed and retracted while the mower is operating. Regardless of the type of cable being employed, a slip ring typically may be used at the hub to connect the rotating cable to the onboard components that require the cable connection. For example, when fiber optic cable is employed, an optical slip ring or fiber optic rotary joint may be used.

Figure 3B:
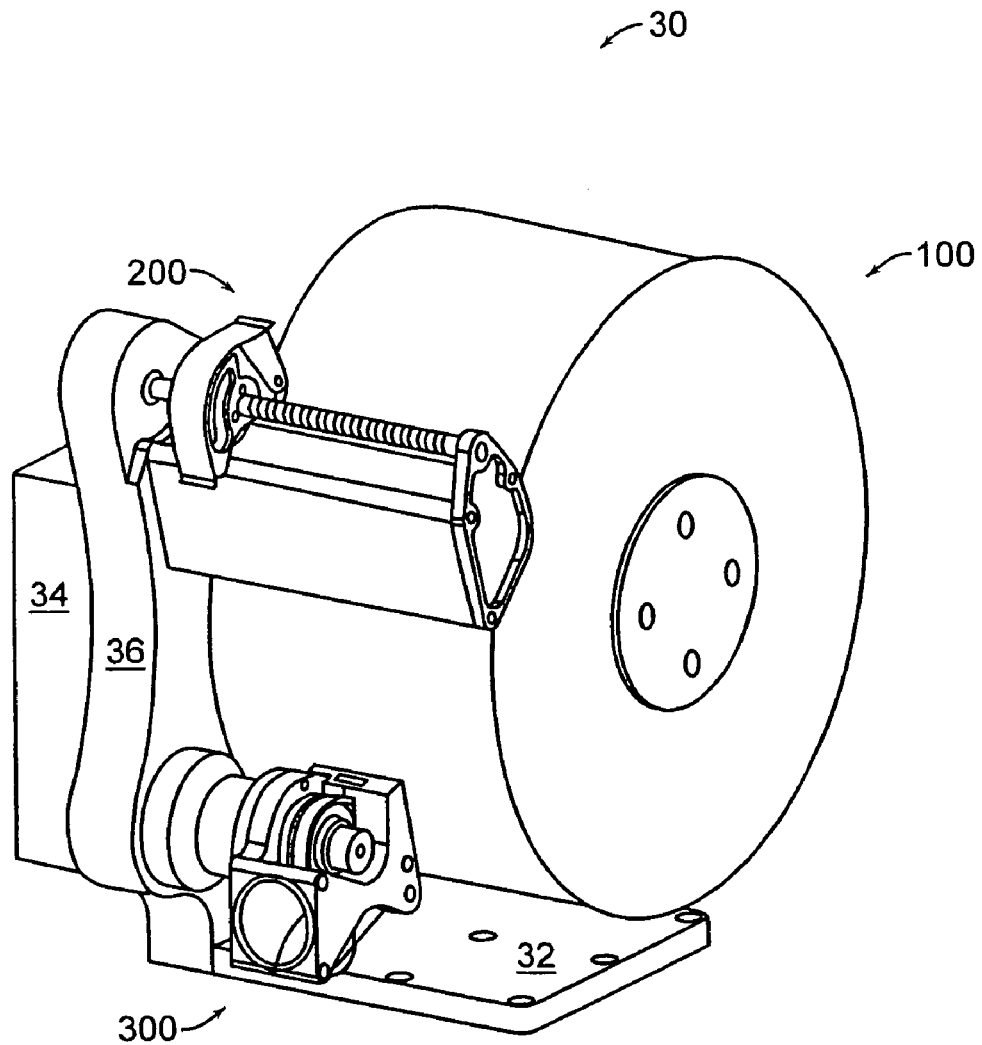

FIGS. 3A and 3B are schematic perspective views of a cable handling system 30 in accordance with one embodiment of the present invention. The handling system 30 includes a cable reel drive 100, a level wind mechanism 200, and a tension roller drive 300. A chassis or base 32 provides means for securing the cable handling system 30 to a robotic device or other platform. A first housing 34 contains microprocessors and/or other control components. Additionally, drive mechanisms (e.g., belts, chains, gears, etc.) and related power transmission components are contained in a second housing 36. Additional structural support for the components may be contained within the housings 34, 36. Alternatively, other external structures or exoskeletons may be used to attach the various components to the base 32.

The orientation of the cable handling system 30 on a robot or other mobile platform may also vary. While this embodiment is depicted in an upright position, with the axis of rotation of the cable reel drive 100 in a horizontal orientation, other embodiments may be mounted in an inverted orientation (i.e., base 32 secured to the underside of a platform), or sideways. Moreover, the embodiment of the handling system 30 depicted in FIGS. 3A and 3B can be used as an aftermarket or retrofittable cable handling system. For example, the handling system 30 may be secured via the base 32 to the chassis of a mobile platform that originally was not designed to carry a cable spool. In such a case, the control system would be integral with the cable handling system itself. For robots or other mobile platforms where the handling system of the present invention is a design expectation, the control system may be either part of the handling system, or integral with the other robot controls. Thus, the handling system 30 may be used to increase the versatility of robots or other mobile platforms that were traditionally limited in application.

Figure 4:
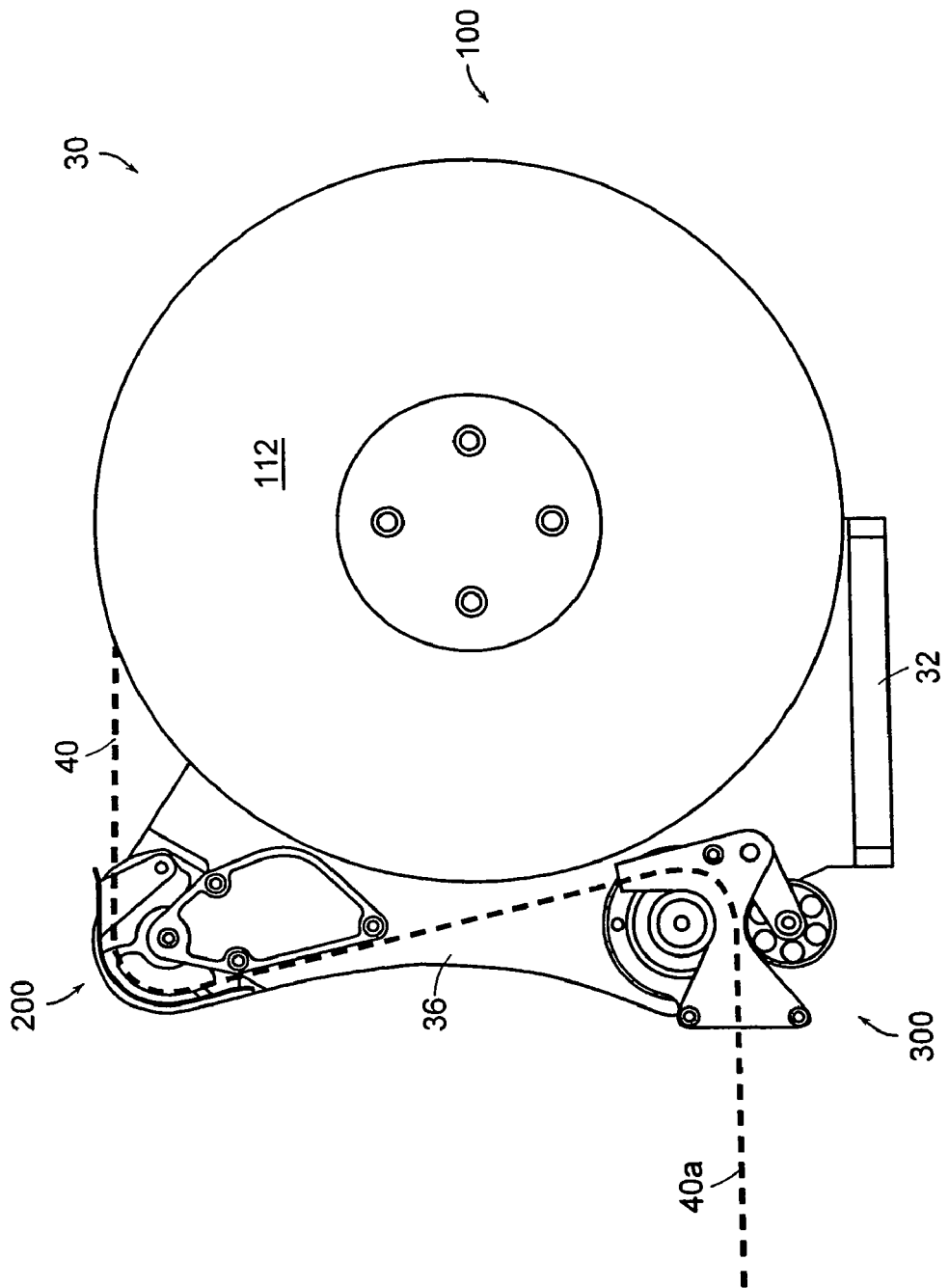
FIG. 4 is a schematic side view of cable handling system of FIGS. 3A-3B.

FIG. 4 shows a side schematic view of the handling system 30, and the path of the cable 40. The cable 40 is unwound from the cable reel 112, then guided "downstream" (i.e., away from the cable reel 112) through the level wind mechanism 200. Downstream from the level wind mechanism 200, the cable 40 passes through the tension roller drive 300 and is subsequently deposited as zero tension cable 40a away from the robot.

Figure 5:
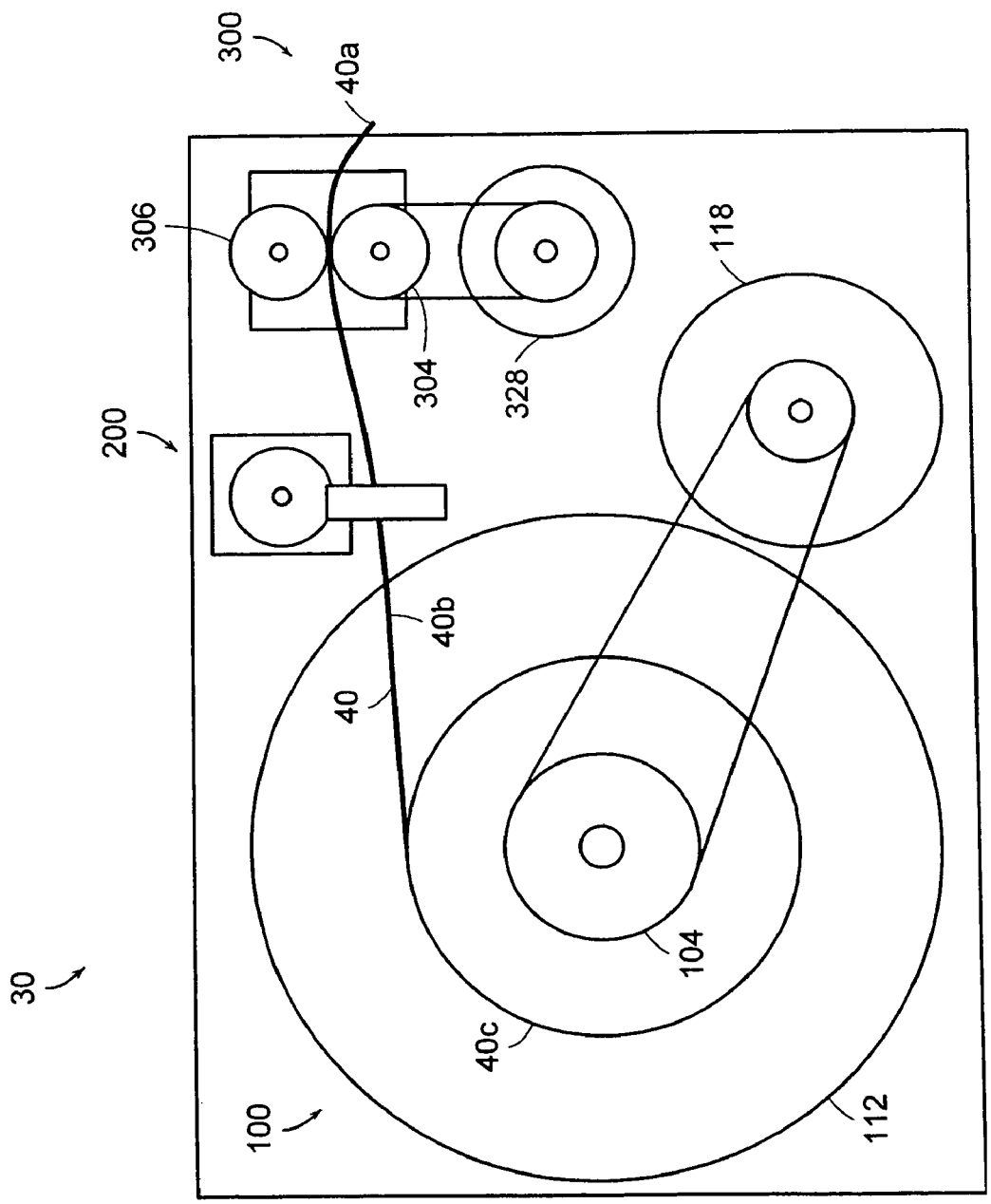
FIG. 5 is a schematic diagram of a cable handling system in accordance with one embodiment of the invention.

Referring now to FIG. 5, a schematic diagram of a cable handling system 30, in accordance with one embodiment of the present invention, is shown. The cable reel drive 100 is driven by a hub motor 118. Hub motor 118 can be a high torque motor, to control responsively the inertial forces of the cable spool 112. Wrapped around the hub 104 of the cable spool 112 is the stowed portion of the cable 40c. The stowed portion of the cable 40c is guided during wrapping and unwrapping by the optional level wind mechanism 200. Use of the level wind mechanism 200 ensures a proper wrap of the cable 40 on the spool 112, without tangles, kinks, or the like. As such, it is possible for the cable handling system 30 to use very long lengths (e.g., up to 1 kilometer or more) of very delicate fiber optic cable, with a significantly reduced risk of damage to the cable 40, due to improper wrapping.

The portion of cable 40 between the cable spool 112 and the tension roller drive 300 is referred to as tensioned cable 40b. The tension roller drive 300 attempts to maintain a constant tensile force on the tensioned cable 40b. In other embodiments, the tension roller drive 300 attempts to maintain a constant torque. In either case, this creates a slight tensile force on tensioned cable 40b, by the tension roller drive 300 attempting to draw a slightly greater amount of cable 40 than the cable spool 112 is dispensing or, conversely, by the tension roller drive 300 attempting to pick up slightly more cable 40 than the cable spool 112 takes in. Control of this dispensing and retracting process is described in greater detail below.

The tension roller drive 300 includes a tension pulley motor 328 to drive a tension pulley 304, and an idler roller 306 located on the opposite side of the cable 40 from the tension pulley 304. As the idler 306 is not powered, slippage between the cable 40 and the idler 306 is negligible. An idler sensor or encoder monitors the rotation of the idler 306, thus accurately tracking the amount of cable 40 or speed of cable 40 passing through the tension roller drive 300 at any given time. Downstream from the tension roller drive 300, zero tension cable 40a is deposited as the robot moves.

Generally, the cable handling system 30 utilizes a high torque/low bandwidth hub motor 118 and a low torque/high bandwidth tension pulley motor 328. The high torque hub motor 118 is able to compensate for the high mass associated with the cable reel drive 100, including the cable spool 112 and other components described in more detail below. Conversely, the lower inertial mass associated with the tension roller drive 300, requires the low torque tension pulley motor 328. The bandwidth gives an indication of the speed of response of a control system: a high bandwidth corresponds to a fast response, a low bandwidth to a slow response. A higher bandwidth allows for accurate, fast response to numerous, arbitrary inputs.

Figure 6:
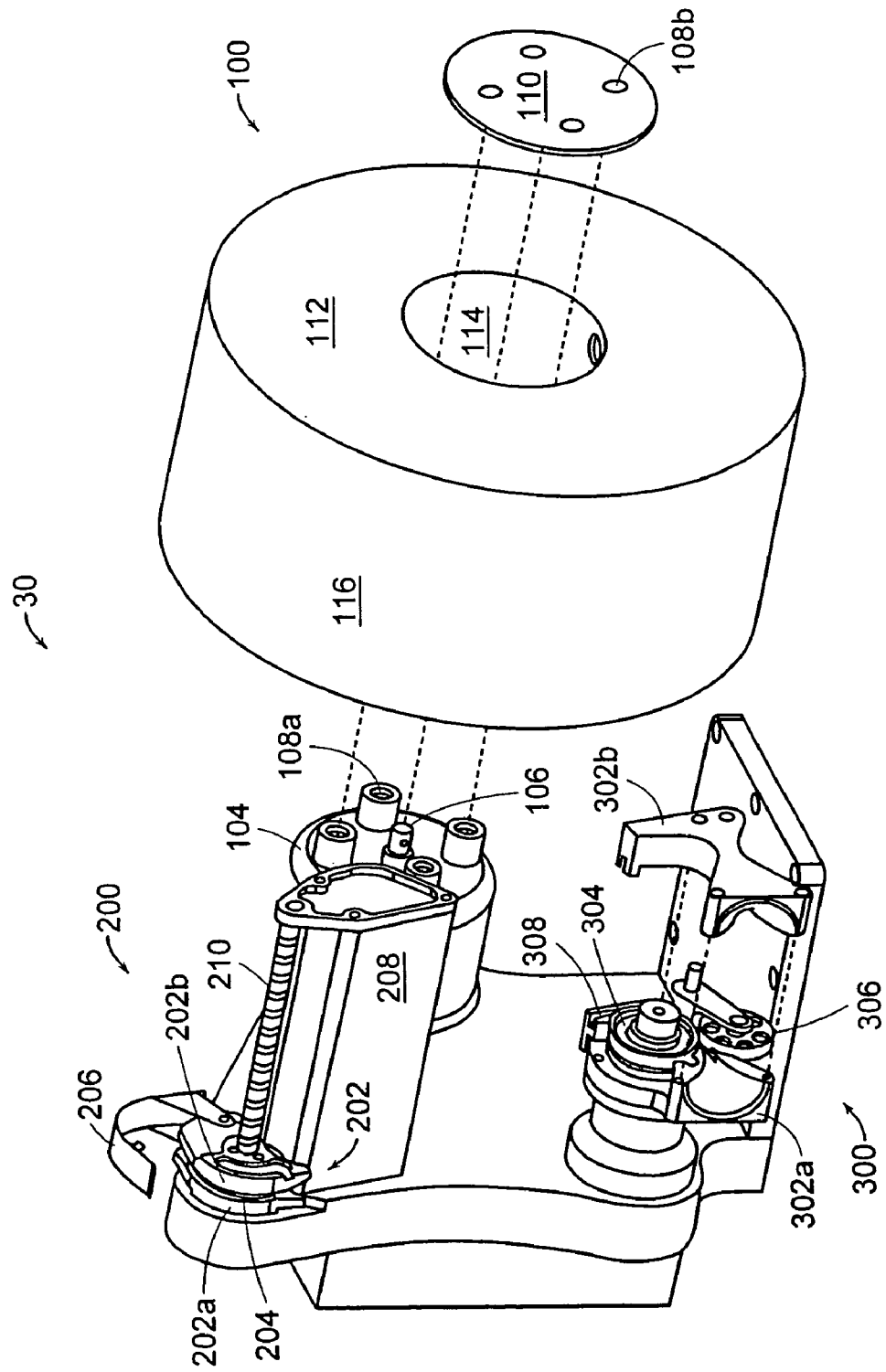
FIG. 6 is a exploded schematic perspective view of the cable handling system of FIGS. 3A-3B.

The structural details of the cable handling system 30 will now be described with reference to FIGS. 6-10. FIG. 6 shows an exploded perspective view of the cable handling system 30. A hub motor 118 (FIG. 8) drives a hub 104, which rotates about a central shaft 106. A plurality of connections 108a are used to secure a spool retainer 110 to the hub 104. In this embodiment, bolts can be threaded through holes 108b in the spool retainer 110 to join with the threaded connections 108a on the hub 104. Alternatively, connections such as press-fit, snap-on, or friction-fit, may be used as well, and greater or fewer connections than those shown in FIG. 6 may be employed. Other means for connecting the spool retainer 110 to the hub 104 are well known to those of ordinary skill in the art.

The spool retainer 110 secures the cable reel 112 to the hub 104. Generally, the hub 104 is inserted through the central bore 114 of the cable reel 112. The force exerted by the spool retainer 110 alone may be used to prevent the hub 104 from rotating independent of the cable reel 112, but additional elements may be desirable. For example, a protrusion located axially along the outer circumference of the hub 104 may be formed to mate with a groove on the inner surface of the bore 114. Alternatively, a locking mechanism may be used. The cable is wrapped in the cable storage area 116 of the cable reel 112.

The level wind mechanism 200 directs the cable so that the cable is properly directed to and dispensed from the cable reel 112. The level wind mechanism 200 includes a level wind router 202 formed of two housing components 202a, 202b. These two components 202a, 202b are configured such that, when joined, they form two sides of a generally U-shaped trough 204. The sides of the trough 204 are spaced as required to provide sufficient clearance for the cable. The base of the trough 204 is formed by a roller that rotatably supports the cable as the cable passes over it. A cover 206 prevents the cable from escaping the trough 204. The level wind router 202 tracks axially along a level wind shaft 210. The shaft 210 has a continuous groove formed in its surface that mates with a protrusion on the bottom of the router 202. As the shaft 210 rotates, the router 202 is guided along the length of the shaft 202, supported from below by the level wind frame 208. Upon reaching the end of the shaft 202, the groove changes direction, thus guiding the router 202 back to the original starting point on the shaft 210. As the router 202 oscillates along the shaft 210, cable is either wound on or unwound from the cable reel 112. By evenly winding and unwinding the cable along the width of the reel 112, the tendency of the cable to stack up in one location is minimized, along with the possibilities of kinking, crossing, tangling, or otherwise damaging the cable or causing difficulty in dispensing.

The tension roller drive 300 includes the tension pulley 304 enclosed within two housing components 302a, 302b. In a configuration similar to that of the level wind router 202, the housing components 302a, 302b form the sides of a generally U-shaped trough 308, the base of which is formed by the tension pulley 304. An idler 306 is biased against the cable, generally with a spring (FIG. 7B), in the direction of the tension pulley 304 and holds the cable against the tension pulley 304 as it is fed through the tension roller drive 300.

Figure 7B:
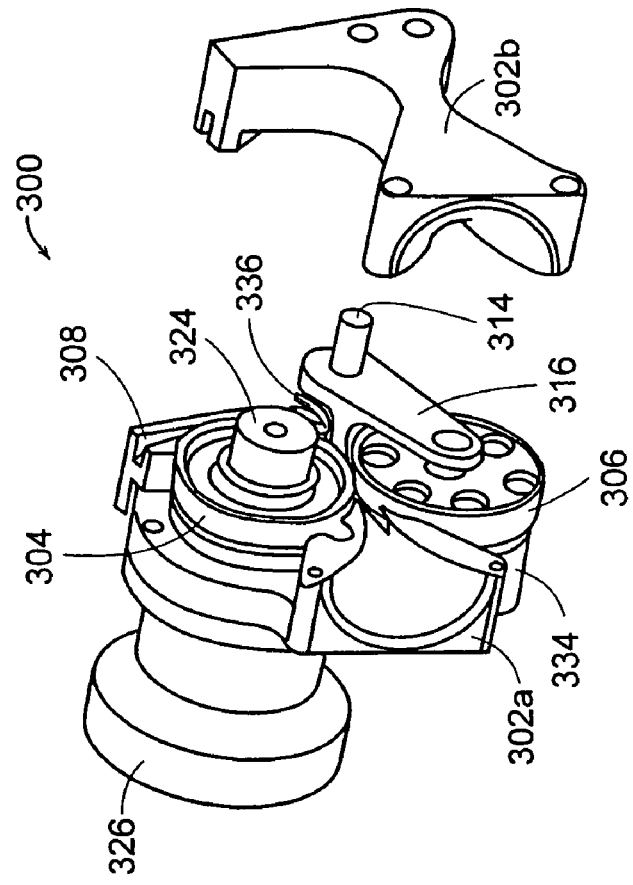
FIGS. 7B-7C are exploded schematic perspective views of the tension roller drive of FIG. 7A.
Figure 7A:
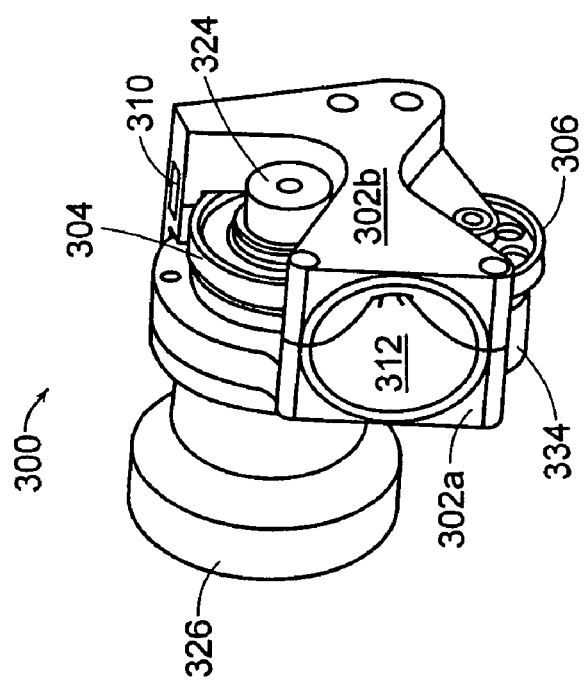
FIG. 7A is a schematic perspective view of a tension roller drive in accordance with one embodiment of the invention.
Figure 7C:
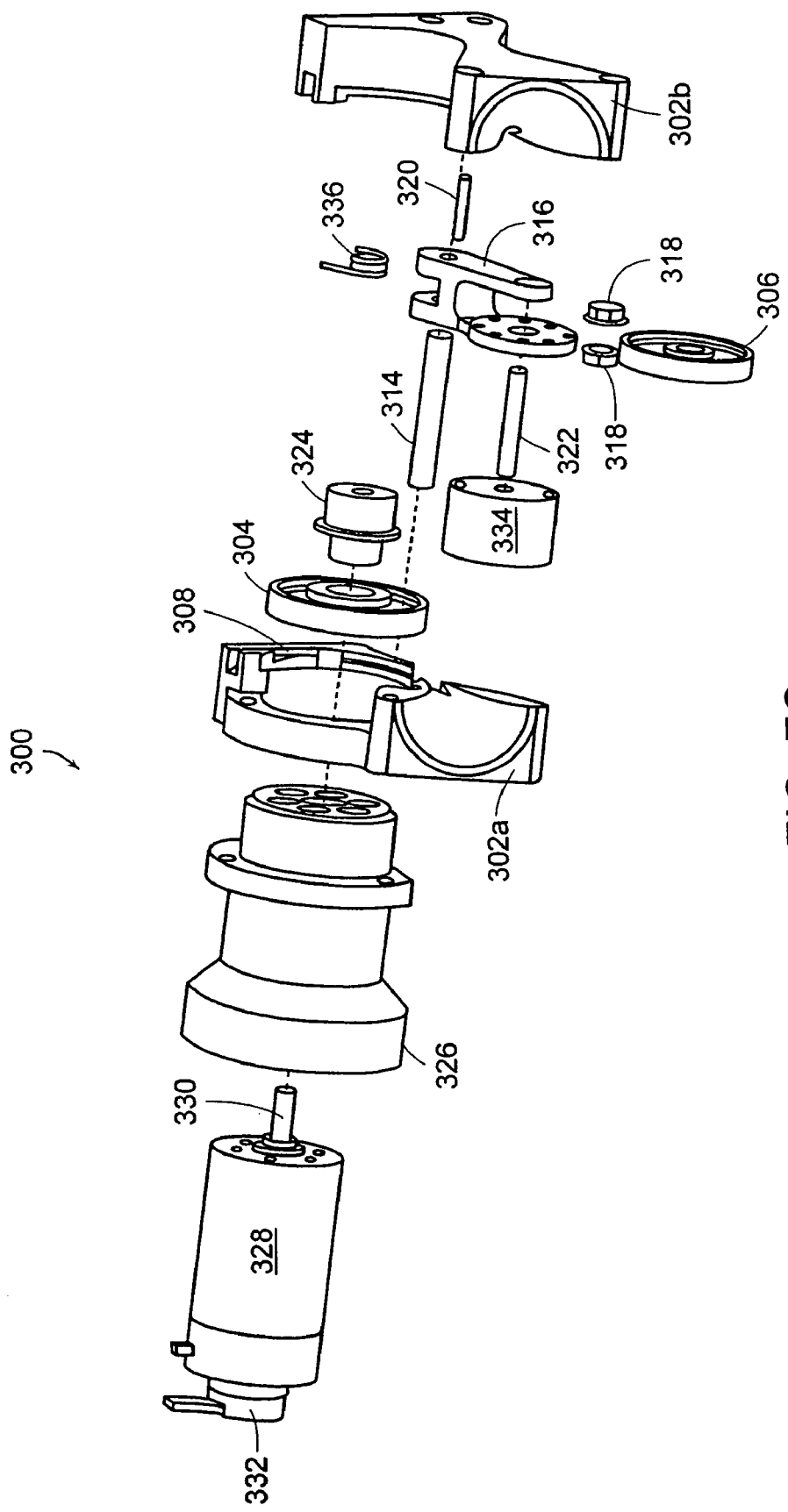

FIGS. 7A-7C show additional views of the tension roller drive 300. FIG. 7A shows an assembled view of the tension roller drive 300 removed from the cable handling system 30. An inlet 310 to the trough 308 is shown, such that it fully surrounds the cable at the point of entry into the tension roller drive 300. Alternatively, this inlet 310 need not be closed on all four sides. A locking hub 324 secures the tension pulley 304 in place. Rotation of the idler 306 is tracked by an idler encoder 334. The unpowered idler 306 is less likely to slip during use than the powered tension pulley 304; thus, the idler encoder 334 can more accurately monitor of the amount of cable passing through the tension roller drive 300 at any given time, regardless of slippage between the tension pulley 304 and the cable. A cable outlet 312 is generally conical in shape, increasing in diameter away from the tension roller 304. This shape prevents the cable from getting caught or stuck on an abrupt outlet transition, especially during cable retraction.

FIG. 7B is a partially exploded view of the tension roller drive 300, with the second housing 302b removed. A dowel pin 314 secures a pinch arm 316 to the tension roller drive 300. The pinch arm 316 may be loosely secured to the dowel pin 314, and thus be free to move about the pin 314. In the alternative, the pinch arm 316 and pin 314 may be securely fastened, such that they rotate together. Force exerted by the idler roller 306 against the cable is provided by a spring 336 that pushes the pinch arm 316. The force exerted is sufficient to prevent slippage between the idler roller 306 and the cable without exerting excessive drag.

As can be seen in FIG. 7B, tension pulley 304 is of solid construction, while idler 306 is penetrated by a plurality of holes to reduce weight and rotational inertia. Alternatively, idler 306 may be solid and tension pulley 304 may have holes, or both may be either solid or penetrated by holes. Also, the outer periphery of both the idler 306 and pulley 304 are flat in this embodiment. In the alternative, the outer periphery may be V-shaped or concave, as required for a particular application. Additionally, the outer-diameter surface of the tension pulley 304 and/or idler 306 may be knurled to improve performance in, for example, wet conditions, or may be made of materials such as elastomers for higher friction. Adding other texture to the outer-diameter surface of the tension pulley 304 or idler 306 may improve performance.

FIG. 7C shows a fully exploded tension roller drive 300. Bearings 318 provide low friction rotation of the idler 306 while being held by pinch arm 316. The idler roller shaft 322 translates rotation of the idler 306 to the idler roller encoder 334. The spring 336 exerts opposite forces against the housing 302a and the pinch arm 316 to bias the idler roller 306 onto the cable. A locking hub 324 secures the tension pulley 304 to a shaft 330 of the tension motor 328. At the opposite end of the motor 328, the tension motor encoder 332 monitors motor rotation. The tension motor 328 is secured within the assembly mount 326, which is used to secure the tension roller drive 300 to the other components of the cable handling system 30.

Figure 8:
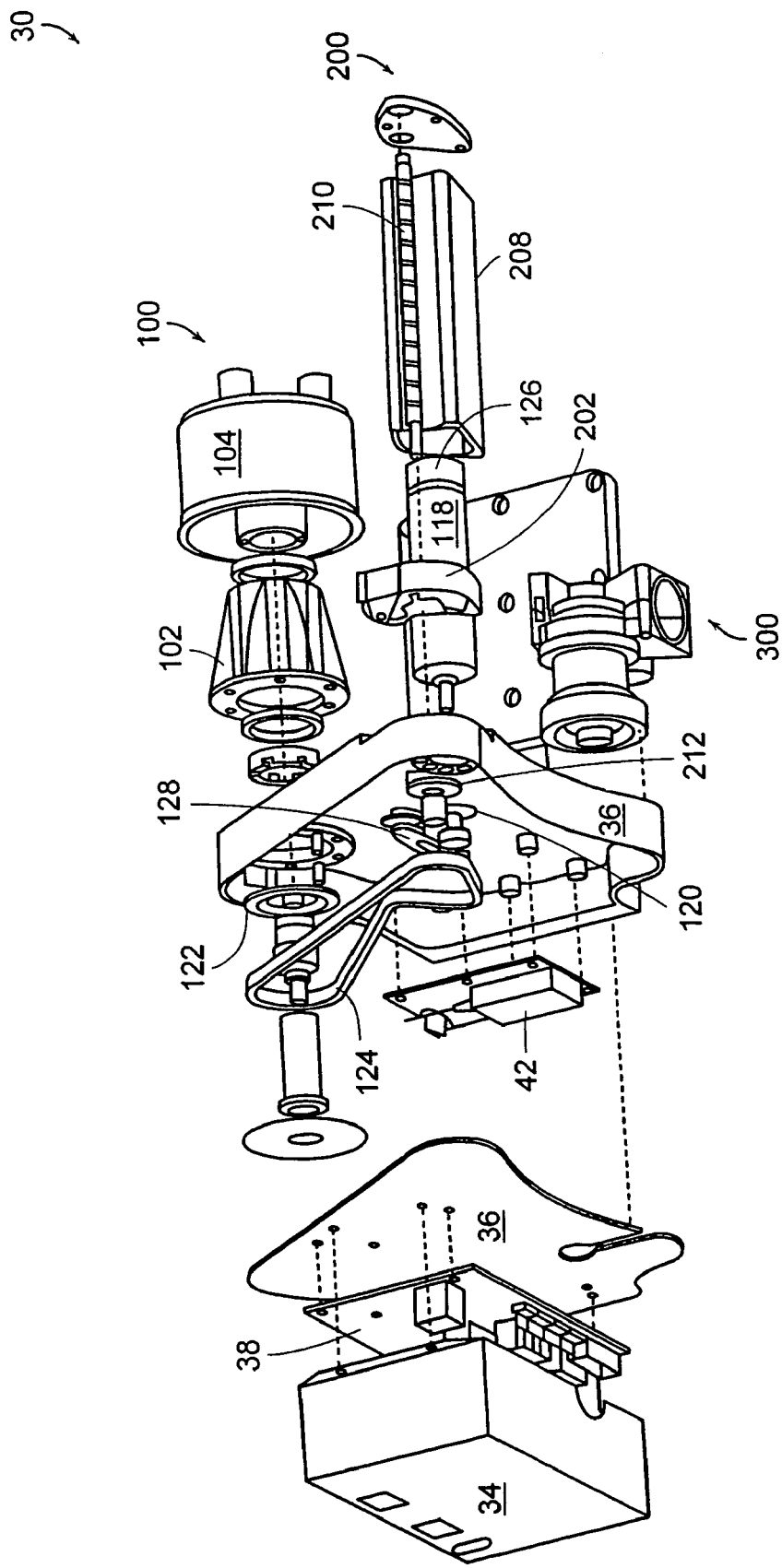
FIG. 8 is an exploded schematic perspective view of the cable handling system of FIGS. 3A-3B.

FIG. 8 depicts an exploded cable handling system 30. The first housing 34 encloses the motor controller 38, and has a plurality of inputs and outputs for communication with other components of the robot. Contained within the second housing 36 are the various driven components of the cable handling system 30 and an ethernet converter 42.

As described above, level wind frame 208 acts as a support for level wind router 202 as it tracks along its shaft 210. Additionally, the frame 208 serves as a housing for the hub motor 118 and its encoder 126. The motor 118 drives both the hub 104 and the router shaft 210 via a chain drive system 130. See also FIG. 9. A chain 124 drives the hub gear 122, which in turn rotates the hub frame 102. The hub frame 102 can secure a range of hub 104 diameters. This is particularly useful where cable reels 112 have different diameter central bores 114. In that case, rather than having to replace a number of components, an operator need only replace the hub 104. Cable spools may have different diameter bores because of differences between spool manufacturers, different gauge cables (which may require larger or smaller central bores), etc. Therefore, with few modifications, the operator could quickly replace the central hub 104 and replace or adjust the level wind mechanism 200 and tension roller drive 300, as necessary to compensate for larger or smaller diameter cable. Prior to use, the operator may need only program the controller 38 to compensate for the change in cable.

Figure 9:
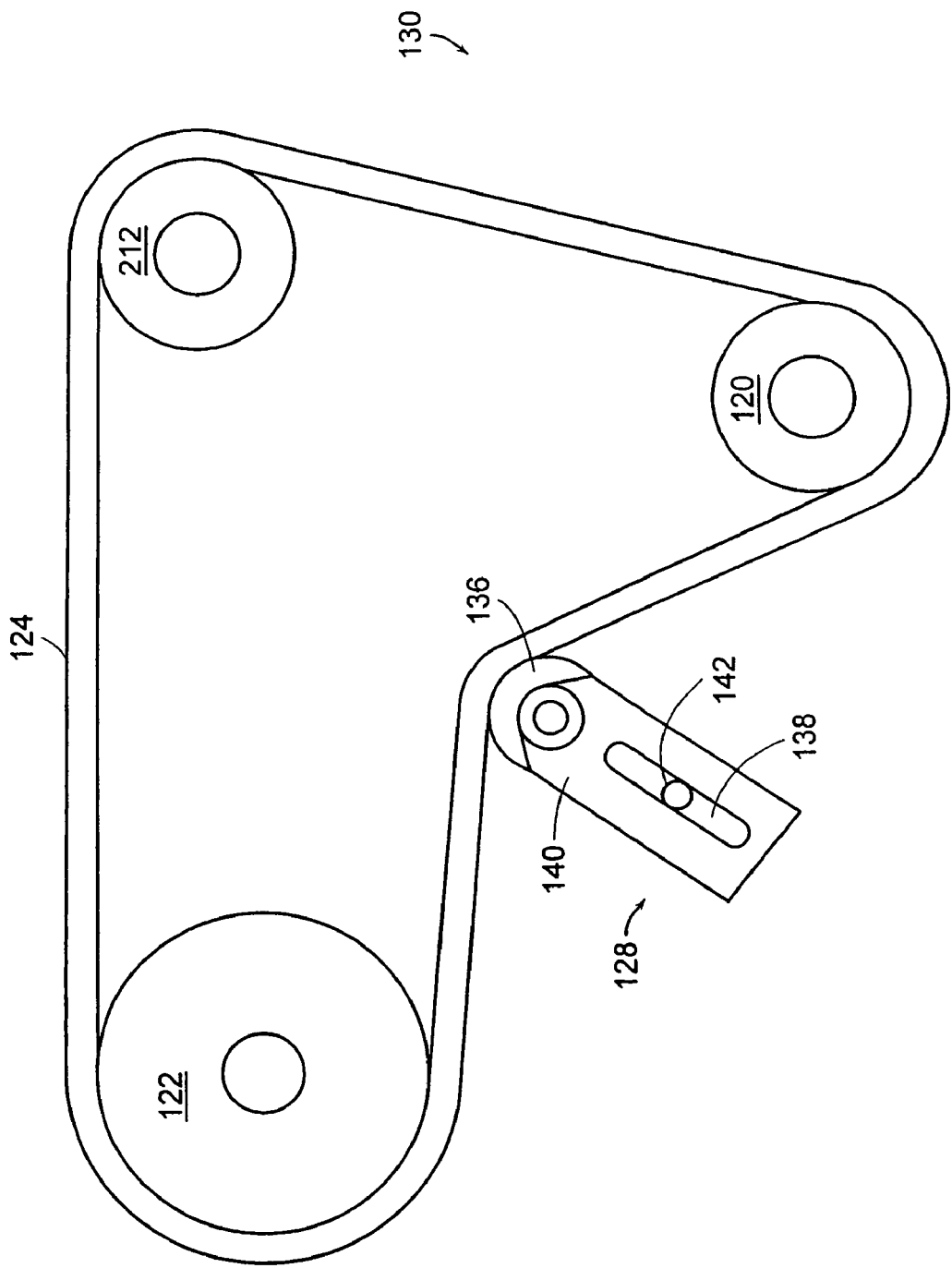
FIG. 9 is a schematic side view of the cable drive system of the cable handling system of FIG. 8.

In the embodiment of the chain drive 130 depicted in FIG. 9, the hub motor directly drives a transfer gear 120, which drives the chain 124. The chain 124, in turn, rotates the level wind transfer gear 212 and the hub gear 122. As such, movement of the hub 104 is directly linked to movement of the shaft 210. Thus, with the appropriate gear ratio, the level wind router 202 can properly track the rotation of the hub 104 and, therefore, of the cable reel 112, ensuring proper packing and removal of cable during use of the handling system 30.

Figure 10B:
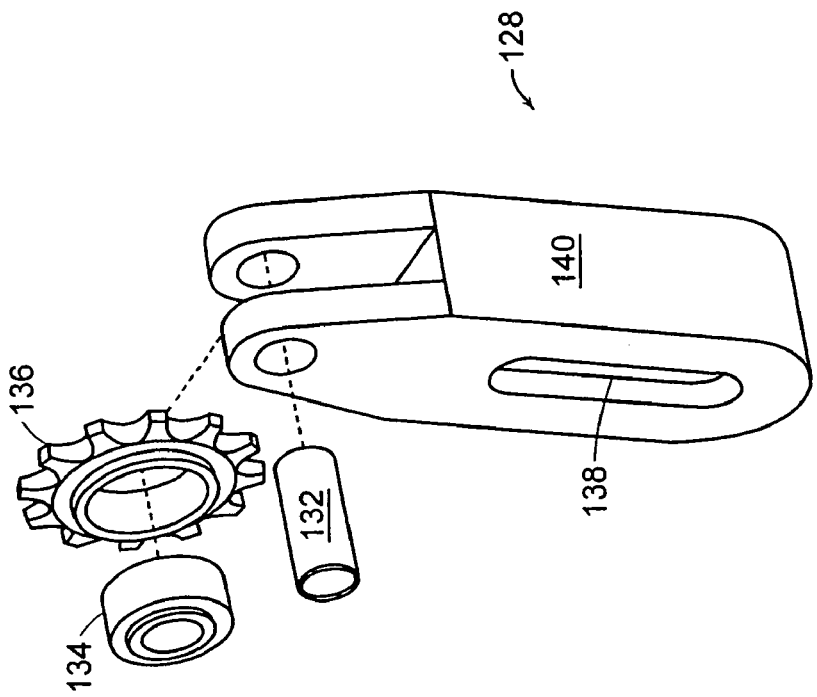
FIG. 10B is an exploded schematic perspective view of the cable tensioner of FIG. 10A.
Figure 10A:
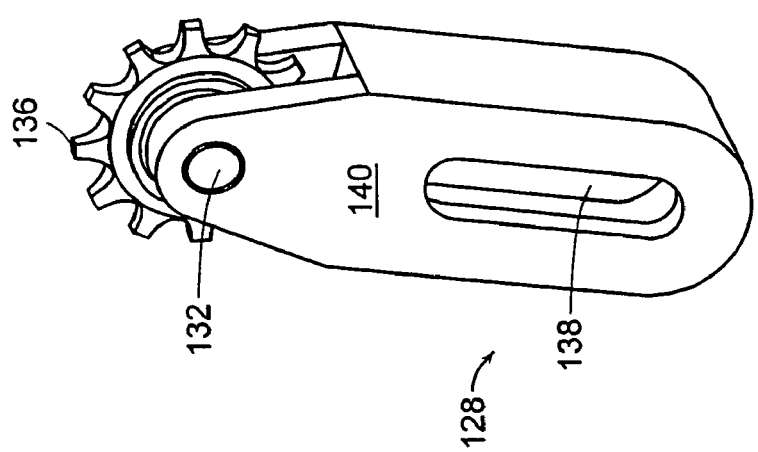
FIG. 10A is a schematic perspective view of the cable tensioner of FIG. 8.

A chain tensioner 128 is used to set the proper tension on the chain 124. An enlarged view of the chain tensioner 128 is shown in FIGS. 10A and 10B. The tensioner 128, in one embodiment, includes an elongated body 140, penetrated by a slot 138, which is sized to engage a bolt 142, set screw, or other attachment device. A sprocket shaft 132 secures a bearing 134, which allows for free rotational movement of a sprocket 136. As shown in FIG. 9, the sprocket 136 engages the chain 124 to provide a tensioning force to the chain 124. The tension can be increased or decreased by moving the chain tensioner 128 axially along the slot 138 and securing it in position with the bolt 142. This ability to adjust the tension on the chain 124 increases ease of chain installation and replacement and allows for accurate tension setting regardless of deviations in chain length and chain wear. Moreover, in another embodiment of the handling system, a belt or other drive may be used in place of the chain drive 130. In such an embodiment, tensioner 128 can be used to compensate for belt stretching and/or component wear after prolonged use.

Figure 11A:
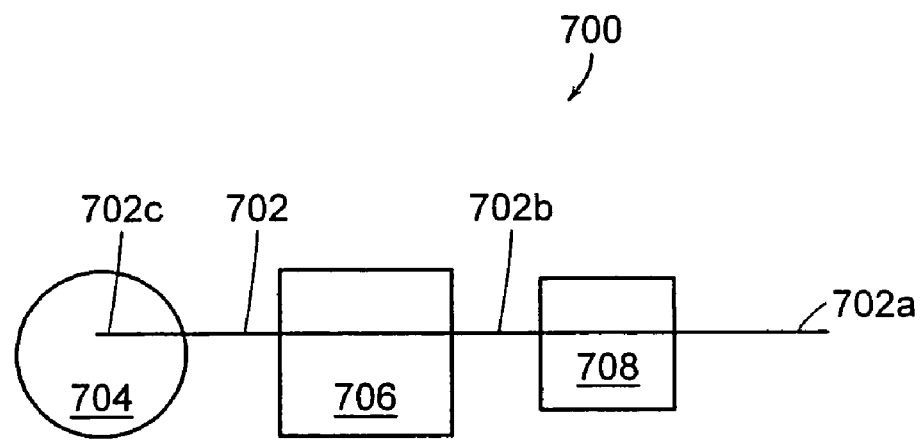
FIGS. 11A-11B are schematic diagrams of two configurations of the cable handling system in accordance with alternative embodiments of the invention.
Figure 11B:
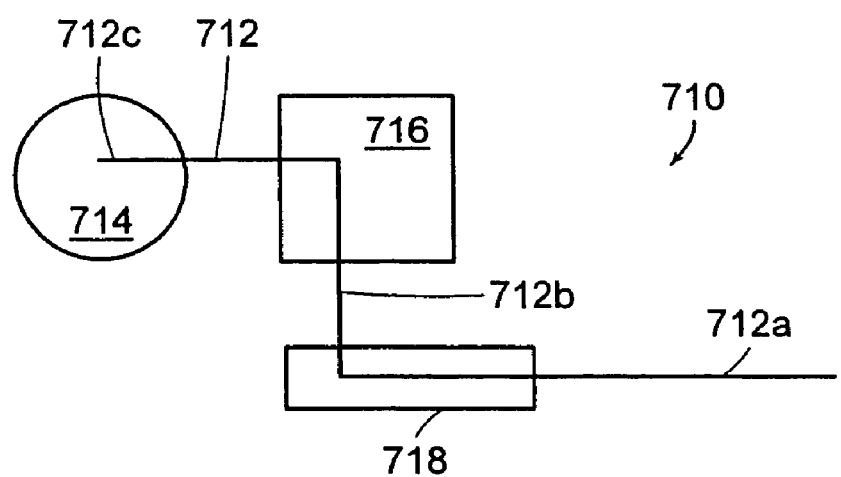

FIGS. 11A and 11B depict two basic exemplary schematic configurations of the cable handling system of the present invention. A "straight line" configuration 700 is shown in FIG. 11A. The cable 702 is routed substantially straight from the cable reel drive 704, through the level wind mechanism 706, and through the tension roller drive 708. Zero tension cable 702a is dispensed downstream of the tension roller drive 708. The tension exerted on the cable 702 internal to the handling system is generally lower than that on the cable 712 described below and allows for a lower overall profile of the device.

FIG. 11B depicts an angular configuration 710 of the cable handling system in accordance with another embodiment of the present invention. In this embodiment, the cable 712 is routed from the cable reel drive 714 then redirected from its current downstream path at the level wind mechanism 716. The cable is then redirected again at the tension roller drive 718, before being deposited as zero tension cable 712a downstream of the tension roller drive 718. This angular configuration 710 is similar to the configuration of the handling system 30 shown in FIG. 4. This configuration provides greater contact between the tension roller drive 718 and cable 702 due to a greater wrap angle (e.g., greater than about 90°) than the straight line configuration 700 described above. In other words, in the straight line configuration 700, the straight line cable 702 contacts the round tension roller drive 708 over a very small angular extent of the pulley's 708 periphery. In such a configuration, the tension roller drive 708 has less contact with the cable 702, and therefore, can not exert as much force as the tension roller drive 718 in the greater angular wrap configuration 710. In the angular configuration 710, the cable 712 contacts more of the tension pulley's periphery as it wraps around the roller 718. As such, greater force can be exerted on the cable 712 without slippage, thereby increasing performance. When mounted to a robot or other mobile platform, this angular configuration 710 can dispense and retract cable at approximately 5.0 m/s and can support fiber optic spools up to 1 km in length, whereas a similar cable in a straight line configuration may be limited to less than 2.0 m/s, for example 1.7 m/s. Motor selection may also effect the speed of the cable dispensed or retracted.

The cable handling system of the present invention can be constructed from a variety of materials. Various individual components may be formed by extrusion or other molding or casting processes. In one embodiment, all components except the gears, sprockets, chains, and other drive mechanisms are constructed of plastic, such as ABS or PVC. Drive components can typically be made of cast or machined aluminum or steel. If the robot is to be used in particularly toxic environments, coated metals and plastics or other materials that resist corrosion may be utilized.

Figure 12:
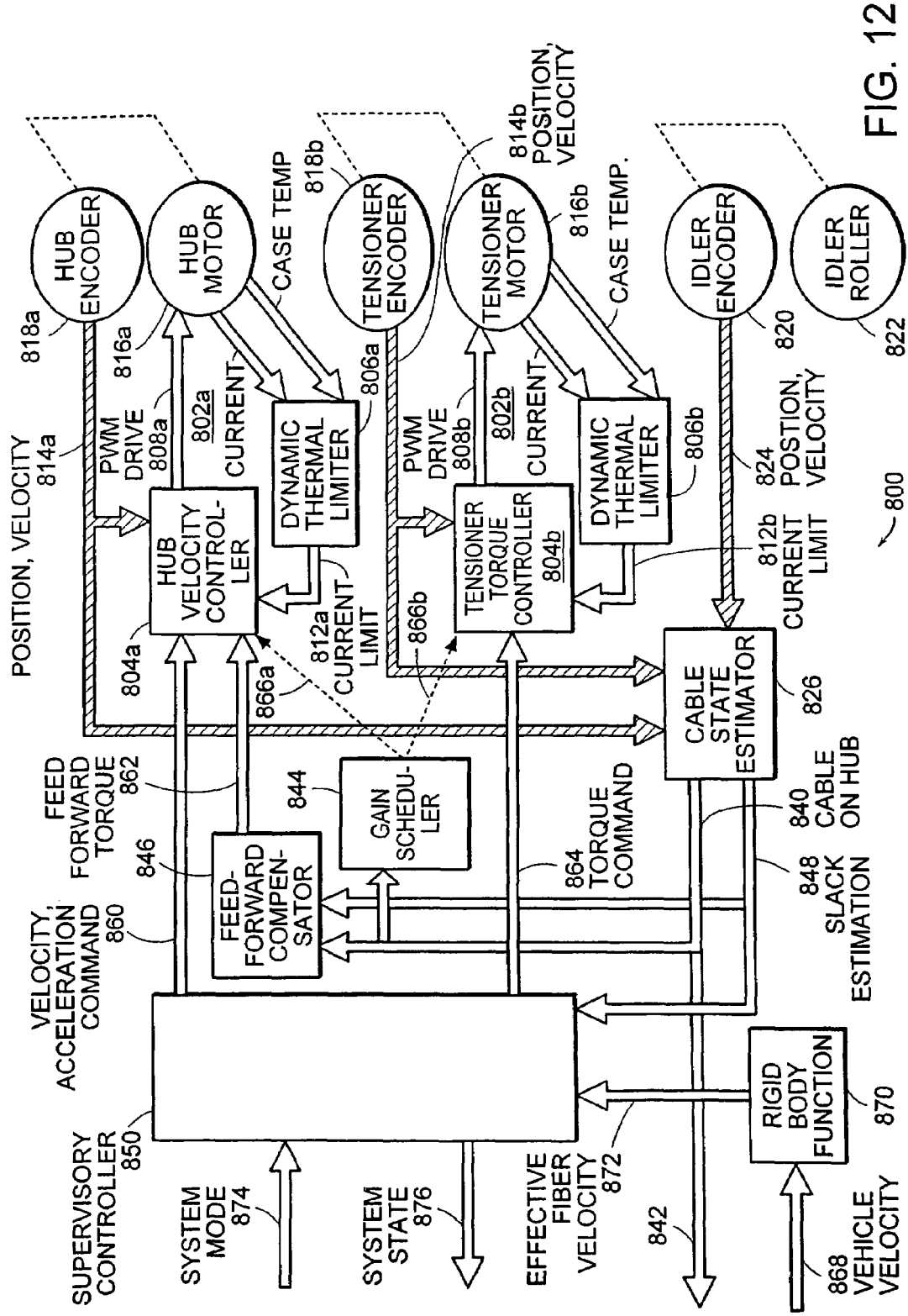
FIG. 12 depicts an embodiment of the cable handling system control system for use with a mobile platform in accordance with one embodiment of the invention.

FIG. 12 depicts an embodiment of the cable handling system control system 800 for a mobile platform. The control system 800 includes a hub motor control loop 802a and a tensioner motor control loop 802b. With certain exceptions, the hub motor control loop 802a and the tensioner motor control loop 802b operate similarly; therefore, a description of a model motor control loop 802 follows. As shown in FIG. 12, reference designators ending in "a" typically represent components or operations of the hub motor control loop 802a, while those ending in "b" typically represent components or operations of the tensioner motor control loop 802b.

The motor control loop 802 includes a controller 804 which drives the motor 816 via pulse width modulation signals 808. In the hub loop 802a, the controller 804a provides velocity-based signals based on input from the supervisory controller 850, described in more detail below. In the tensioner loop 802b, the controller 804b provides torque-based signals based on input from the supervisory controller 850. As the motor 816 rotates, dynamic thermal limiter 806 monitors both the motor current and case temperature readings 810. The dynamic thermal limiter 806 eliminates the need to oversize the motor 816 by modeling the actual thermal state of the motor. This provides a wider dynamic range of the motor 816 by enabling the motor 816 to operate within its dynamic or transient limits, not within the continuous operation limits. As such, the motor 816 is less oversized, which may translate into a smaller, lighter motor and reduced cost. The dynamic thermal limiter 806 also operates as a low-level safety that can limit power to the motor 816. When either the motor current or case temperature 810a exceed their predetermined limits, the dynamic thermal limiter 806 sends current limit signals to the controller 804 which, in turn, limits power to the motor 816. In emergency situations, the controller 804 may completely shut off power to the motor 816.

The encoder 818 constantly monitors the rotation of the motor 816, and provides velocity and position signals 814 to both the controller 804 and cable state estimator 826. Similarly, idler encoder 820 monitors rotation of the idler roller 822 and provides cable velocity and cable position signals 824 to cable state estimator 826. As idler roller 822 is unpowered, however, slippage between the roller and the cable is greatly reduced, if not eliminated. Therefore, the signal sent by the idler encoder 822 is generally an extremely accurate indicator of cable that has been dispensed and retracted. In an alternative embodiment, signals from idler encoder 820, instead of (or in addition to) those generated by the tensioner encoder 818a, may be used to control tensioner motor 816b. The difference in the movement or velocity between the tensioner encoder 818b and the idler encoder 822 can be used to detect or measure the amount of slippage of the tension pulley on the cable. This can be used as part of the control policy of the system. The use of the idler encoder signal, in conjunction with the hub encoder signal, the tensioner encoder signal, and the vehicle movement signal, as discussed in more detail below, ensures enhanced system performance and substantially zero tension, trouble free operation. This is due, in part, to the accuracy associated with cable position and/or velocity measurement. Digital, incremental encoders or other types of encoders or sensors may be used. In the embodiments shown in the figures, the encoders are preloaded to eliminate backlash, but may also be installed on the opposite side of the gear ratio, if desired or necessary.

The cable state estimator 826 uses inputs from the tensioner encoder 818*b*, idler encoder 820, and hub encoder 818*a* to estimate two parameters for the higher-level cable handling system control system 800. These parameters are: (1) the cable-on-hub, which affects cable mass, inertia, and the dynamics of the hub system; and (2) the cable slack, which should be minimized within the handling system cable pathway to prevent tangling.

The cable-on-hub estimation uses the ratio of movement between the hub encoder 818*a* and the idler encoder 820 and tensioner encoder 818*b* to determine the instantaneous effective radius of the hub. In general, this estimation is based on the assumption that the radius of the idler and tensioner rollers are known and roughly constant. This instantaneous measure is low-pass filtered to get a stable low-noise estimate of effective hub radius that tracks the movement of cable. This filtered signal is then scaled by a coefficient determined from the hub internal diameter, hub width, cable diameter, and packing fraction which converts "effective hub radius" into meters of cable remaining 842, which is displayed to the user of the robot. Alternatively, the effective hub radius is determined by monitoring the rotation of the hub and tensioner roller over a given distance and modeling the effective hub radius based on that input. The amount of cable on the hub is then relayed 840 to the feed forward compensator 846 and to the gain scheduler 844 for further calculations.

The cable-on-hub estimation allows the control system to determine the cable remaining on the hub even in the event of a power or other system failure. Since the cable-on-hub estimation can determine the amount of cable on the spool, it also can calculate the instantaneous hub radius at any time. For example, if the robot is moving at a high rate of speed away from the operator, and a temporary system failure prevents proper cable length estimation for a period of time, the cable-on-hub estimation is able to recalculate the amount of cable remaining once the system comes back on-line. Since the idler roller is a known radius, the number of revolutions of the idler can be converted into a length of cable passing through the tension roller drive. The cable-on-hub estimation then compares the number of rotations of the idler to the number of rotations of the hub to determine how much cable is approximately remaining on the hub. As such, this function allows the operator to still know the cable remaining, even after a lapse in system power.

The slack estimation uses the cable on hub estimate to calculate linear fiber distance spooled and compares this linear distance with the distance of travel measured by the tensioner encoder 818*b* and idler encoder 820. This difference approximates the amount of fiber between the hub and the tensioner drive. Since the system has a fixed separation, the difference between this distance and the separation becomes an estimate of slack in the cable. Error accumulates in this slack term over time due to slippage and a heuristic filter is applied to decay the slack estimate over time. This makes slack estimation stable over long term use, but allows the system to respond quickly to dynamic changes in slack in short periods of time, thus reducing the tendency for slack to accumulate due to dynamic movements such as high acceleration and deceleration, etc. This constant estimation of the slack between the hub and tensioner is then relayed 848 to the feed forward compensator 846 and the supervisory controller 850.

The feed-forward compensator 846 supplies an additional torque command 862 to the hub controller 804*a* that seeks to cancel slack inside of the handling system mechanism that prevents tensioning. This feed-forward command 862 takes the slack estimation 848 and scales it by a coefficient to become a counter-rotational torque on the handling system hub. This term serves to couple the dynamics (especially under rapid acceleration) of the hub to the dynamics of the tensioner roller in case the actuators are not perfectly matched. This allows more flexible motor selection for the hub and the tensioner and still provides highly dynamic (accelerating) movement. Essentially, the slack term acts as a dynamic "brake" on the hub velocity controller 804*a* so that it does not overrun the tensioner rollers, which would cause an excess of slack between the hub and the tensioner roller. In the alternative, the system can increase the tension to avoid an overrun.

A gain scheduler 844 compensates for the mass of cable remaining on the hub. As certain embodiments of the handling system can accommodate 1 km of cable or more, the inertia of the hub can change dramatically. For example, a standard spool wrapped with standard fiber optic cable may have as much as five times the mass of the spool alone. Moreover, the mass of this wrapped cable is distributed farther away from the center of the spool than the mass of an unwrapped spool. The gain scheduler 844 acts as a correction factor to compensate for this changing mass of the spool and signals 866 the controller 804 of each motor control loop 802.

Robots employing zero cable tension payout systems can have difficulty paying out cable when moving in directions that deviate from a straight line. For example, when monitoring robot drive wheel rotations as the primary control parameter, an improper amount of cable can be dispensed. A particular problem occurred when prior art robot attempted to execute a zero radius, or neutral, turn (i.e., a rotational turn where the robot does not move forward or backward while turning). The handling system of the present invention compensates for the possible problems associated with any turns (including a zero radius turn), by storing in its memory the distance between the axial center of the robot (i.e., the point around which the robot would rotate) and the outlet of the cable handling system. While moving, the supervisory controller 850 monitors vehicle velocity which it converts into effective fiber velocity based on the configuration and velocity of the robot. In one embodiment, a rigid body transform function 870 is performed for this conversion.

The rigid body transformation 870 takes in the vehicle velocity 868 in local vehicle coordinates and transforms this input velocity 868 to be the local velocity of the fiber exit point 872 of the handling system, factoring in the handling system mode input 874. This allows the fiber handling system to match vehicle movement regardless of mounting location or movement of the vehicle, including zero radius or neutral turns (spinning in place). The input to the rigid body transform function 870 is the linear and angular velocity of the vehicle 868 in its own local coordinate frame and the output is transformed, based on the position and orientation of the fiber exit point on the handling system (a parameter configured by the user for a particular installation). The vehicle velocity 868 is generally determined by employing one or more sensors to monitor the drive system of the robot or mobile platform. In order to account for inaccuracies in robot velocity correction to the cable speed, a correction factor may be introduced in the control system. For example, a corrective model with a multiplicative term and an additive term could be utilized. The multiplicative term may change when cable is being dispensed or retracted, and represents a relative adjustment to the robot velocity. The additive term may be used to provide a constant or user selectable offset under manual mode or possibly in some operational state.

The supervisory controller 850 governs the servo commands that are sent to the lower levels of the handling system control system 800. It also monitors cable slack and can assert an error state if too much slack or overrun develops within the cable handling system. This prevents tangling and damage of fragile cables such as optical fibers. The basic operation of the supervisory controller is to map the desired fiber velocity into a hub velocity command 860 and a tensioner torque command 864, depending on the mode of operation of the handling system.

In other words, the supervisory control 850 determines the vehicular velocity and calculates the amount of cable pay-out required to lay cable at zero tension. Accordingly, the supervisory controller 850 provides a velocity command 860 to the velocity controller 804a to dispense the appropriate amount of cable. Simultaneously, the supervisory controller 850 provides a desired torque command 864 to the tensioner torque controller 804b. This torque command 864 is sufficient to maintain tension on the cable between the hub and tension roller drive, to prevent kinking or knotting of the cable. Conversely, while picking up cable, the torque command 864 provides just enough resistance against the force generated by the motor 816a to keep tension on the cable. Regardless of direction or mode, the tension roller drive always provides resistance tension on the cable between the tension roller drive and the hub, thus preventing cable tangling and knotting.

Moreover, as the supervisory controller 850 is signaling a payout of cable based on vehicular velocity, the idler roller is used to confirm that the proper amount of cable is being dispensed. If the signals from the idler roller indicate that no cable is being dispensed, or that too much is being dispensed, an error message may be sent. Alternatively, if the robot is not moving and the idler roller is sensing movement of the cable (i.e., is someone is pulling on the cable), the supervisory controller can begin turning the hub and tension drive to avoid creating tension on the cable. This can happen almost instantaneously, as soon as the idler roller begins to move. This function is particularly useful when initially setting up the robot and cable system, as the operator need only pull the cable slightly for automatic cable dispensing to begin. The operator can then connect the fiber optic cable to the base (a monitor screen, for example) and quickly begin using the robot.

the supervisory controller 850 also utilizes an encoder correction algorithm to ensure that the cable handling system dispenses slightly more cable or retracts slightly less cable than required. This correction algorithm may provide, for example, an additional 2 to 5 percent of cable length during pay out to correct any systemic errors in the cable handling system, and thus ensure that there is sufficient cable outside of the cable handling system, thereby reducing the likelihood of tensioning the cable. Different correction factors may be used depending on environmental concerns, design limitations, operator requirements, or any other factors. In general, the encoder correction algorithm helps ensure that tensioning on the cable between the cable handling system and the stationary base is minimized.

The supervisory controller 850 automatically selects an appropriate handling system mode based on a handling system mode input 874 based on the movement of the robot. Additionally, the controller 850 outputs the state of the handling system 876 back to be observed by the operator. The modes and their mappings are described below; however, other modes of operation using the electromechanical and control system advantages of the disclosed system are contemplated as well.

Idle mode: The supervisory controller 850 sends zero hub velocity and a small tensioner torque to keep the system still when not being used. Alternatively, the controller 850 may turn off power to the cable handling system (to conserve energy), then occasionally energize the system to maintain tension on the cable. Independent factors such as time or distance may be utilized to determine when to energize the system.

Track mode: The supervisory controller 850 takes the fiber exit point velocity from the rigid body transform 870 and determines (by dot product of vectors) the effective translation velocity (i.e., sign and magnitude) of the handling system. This becomes the velocity command sent to the hub velocity controller. In this and the other modes, a mode-dependent tensioner torque 864 is sent to the tension rollers to keep cable tension to a preset low level within the mechanism to reduce the chance of tangling. In this mode the fiber goes out when the vehicle moves forward and back in when the vehicle backs up.

Track Reverse mode: This is the same as Track mode, but the sign of the velocity is negated. As such, when the vehicle moves forward cable is taken up, and when the vehicle moves backward cable is payed out. Additionally, this mode is used when returning from a location while driving over the cable that was dispensed en route to a location. It results in picking up the cable that was put out and reduces the need for additional cable cleanup after operation.

Track In mode: The supervisory controller 850 takes the fiber exit point velocity from the rigid body transform and uses the magnitude of the velocity to send a negative hub velocity command 860 to reel in fiber in proportion to vehicle movement. This mode always reels in fiber.

Track Out mode: The supervisory controller 850 takes the fiber exit point velocity from the rigid body transform 870 and uses the magnitude of the velocity to send a positive hub velocity command 860 to pay out fiber in proportion to vehicle movement. This mode always pays out fiber. A tensioner torque command 864 is sent to the tension rollers to keep cable tension to a preset low level within the mechanism to reduce the change of tangling. This mode is primarily used en-route from the start location to a destination when the vehicle is being driven over the fiber interface, and may be useful on systems where odometry is poor.

Error mode: The supervisory controller 850 zeros command outputs when an error is detected and reports this error through the handling system state output 876 to higher-level software for display to the user. This error is triggered in cases where too much cable slack has accumulated inside the handling system and a tangle is in progress or imminent.

While there have been described herein what are to be considered exemplary and preferred embodiments of the present invention, other modifications of the invention will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the invention. Accordingly, what is desired to be secured by Letters Patent is the invention as defined and differentiated in the following claims.

What is claimed is:

1. A cable handling system comprising:
   a cable reel drive;
   a downstream tension roller drive comprising an idler;
   an idler sensor for monitoring a movement of the idler, the idler sensor determining at least one of a position along a length of cable and a cable speed; and
   a system controller in communication with the sensor for controlling the cable reel drive and the tension roller drive for dispensing and retrieving cable downstream of the tension roller drive at substantially zero tension.

2. The cable handling system of claim 1, wherein the cable reel drive comprises a motor and a sensor for determining rotation of the cable reel drive.

3. The cable handling system of claim 2, wherein the tension roller drive further comprises a motor and a sensor for determining rotation of the tension roller drive.

4. The cable handling system of claim 3, wherein the system controller comprises a cable state estimator for receiving signals from the idler sensor, the cable reel drive sensor, and the tension roller drive sensor.

5. The cable handling system of claim 3, wherein at least one of a cable reel drive and a tension roller drive further comprises at least one dynamic thermal limiter for monitoring at least one of a motor current and a motor case temperature.

6. The cable handling system of claim 1, further comprising a level wind mechanism located between the cable reel drive and the tension roller drive.

7. The cable handling system of claim 1, wherein the system controller comprises a cable reel drive velocity controller.

8. The cable handling system of claim 1, wherein the system controller comprises a tension roller drive torque controller.

9. The cable handling system of claim 1, wherein the system controller comprises a feed forward compensator for providing a torque command to the cable reel drive velocity controller.

10. The cable handling system of claim 1, wherein the system controller comprises a cable gain scheduler for providing a compensating command to at least one of the cable reel drive and the tension roller drive, wherein the compensating command compensates for a change in mass of a cable spool as the cable is dispensed and retrieved.

11. A control system for a cable handling system comprising:
    a cable reel drive controller;
    a tension roller drive controller;
    an idler sensor for monitoring a movement of an idler, the idler sensor determining at least one of a position along a length of cable and a cable velocity; and
    a system controller for providing commands to the cable reel drive controller and commands to the tension roller drive controller, the commands based at least in part on a signal from the idler sensor, whereby a cable is dispensed and retrieved from the cable handling system at substantially zero tension.

* * * * *